Figure 1:
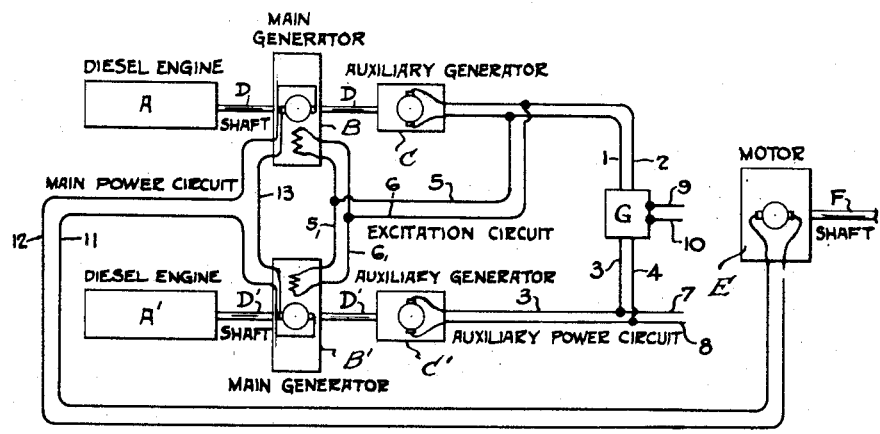

Oct. 7, 1930.    L. M. GOLDSMITH    1,777,845
CURRENT DISTRIBUTION SYSTEM

Filed May 1, 1928

INVENTOR
LESTER M. GOLDSMITH.
BY *T. Wallace Quinn*
ATTORNEY

Patented Oct. 7, 1930

1,777,845

UNITED STATES PATENT OFFICE

LESTER M. GOLDSMITH, OF HIGHLAND PARK, PENNSYLVANIA, ASSIGNOR TO THE ATLANTIC REFINING COMPANY, OF PHILADELPHIA, PENNSYLVANIA, A CORPORATION OF PENNSYLVANIA

CURRENT-DISTRIBUTION SYSTEM

Application filed May 1, 1928. Serial No. 274,253.

The present invention relates to electrical distribution systems and more particularly to systems wherein power is supplied from two or more sources to two or more mechanisms for the utilization of such power.

Such a system as herein disclosed is particularly adaptable for use in connection with motor generator sets, such for example, as sets in which Diesel type of oil engines are used as prime movers.

More particularly, this invention is adaptable for use in connection with the electrical propulsion of ships in which an oil engine as of the Diesel type is connected directly with a main generator and an auxiliary generator, the main generator in turn being electrically connected with a motor which drives the propeller, and the auxiliary generator being connected with other current consuming machines, such for example, as the motor used to operate the steering mechanism.

This invention will be described in connection with motor generator sets driven by Diesel engines, such sets being in common use in ships propelled by means of the so-called Diesel electric drive. It is not however, intended to confine the invention by such detailed description, the breadth of invention being limited only by the scope of the appended claims.

In the operation of a Diesel electric propulsion system for ships, the electric power generating portion of such system usually comprises two or more independently operated units, each consisting of a Diesel engine, a main generator, and an auxiliary generator. Either or several of the main generators of these Diesel engine units may supply power to the electric driving motor of the propeller shaft. The power produced by the auxiliary generator of one of the units is ordinarily used for excitation or field current in either or several of the main generators, and the power produced by the auxiliary generator of a second unit is used for operating the various electrical navigation devices, such for example, as the steering engine, the gyro-compass and the gyro-pilot, as well as such incidental electrical apparatus as electrically driven water pumps, or the like. It is essential that the electrical navigation devices be supplied with current at all times with no interruption in such current supply.

In accordance with this invention, an uninterrupted supply of current to the electrical navigation instruments or mechanisms, whose operation is essential at all times, is automatically maintained. Furthermore this maintenance of current supply to the various mechanisms as aforesaid, is effected without paralleling circuits, that is, without supplying current from a single source over two or more circuits in parallel to one or more instruments or mechanisms. Provision is made so that when one circuit fails for any reason, and the supply of power to the electrically operated mechanism or mechanisms is thereby discontinued, such circuit is immediately cut out and another circuit from an independent source of current supply is simultaneously switched into the line leading to the mechanisms. In this way an uninterrupted supply of current to the mechanisms is maintained at all times and voltage losses which result when current is supplied over parallel circuits from a single source to a current consuming mechanism is thereby avoided. Further and more particularly, in accordance with this invention, when the voltage in the particular line supplying current to the various electrical navigation mechanisms drops below a predetermined minimum such line is automatically cut out, and another line from an independent source of current in which the voltage is above such predetermined minimum is switched in.

Figure 2:
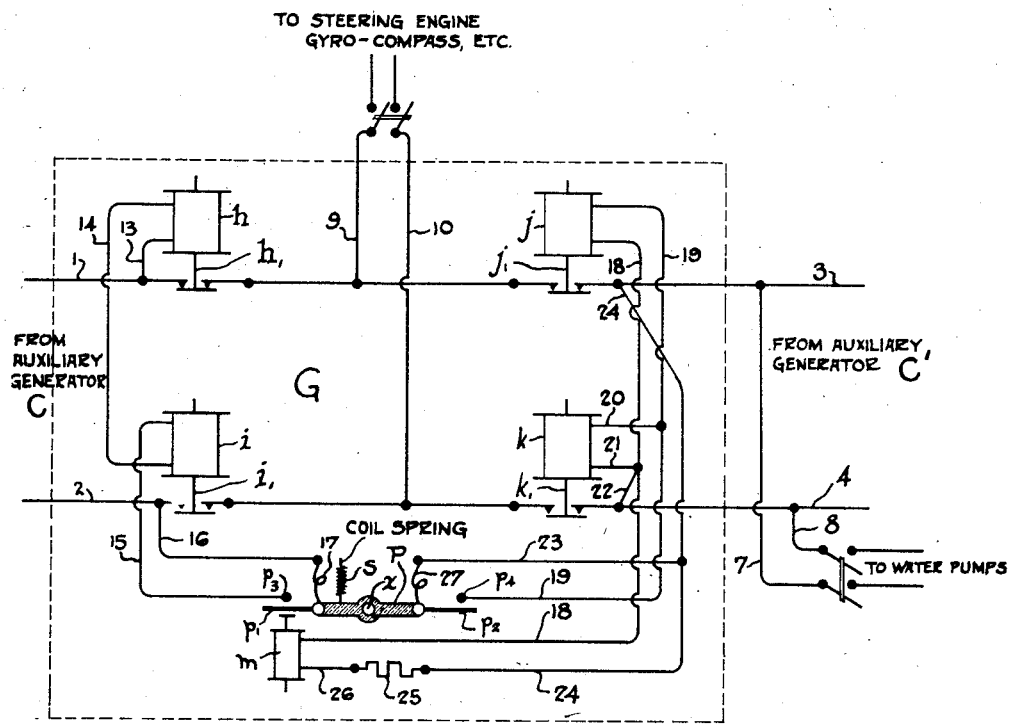

For a clearer understanding of my invention, and in order to illustrate one of the various ways in which the results as above set forth may be attained, reference is had to the accompanying drawing, in which:

Fig. 1 is a diagrammatic representation of a Diesel electric propulsion system and the electric circuits forming a part thereof, and Fig. 2 is a diagram of an electrical circuit in which the automatic transfer mechanism used in connection with the propulsion system is incorporated.

Referring to Fig. 1, A and A' represent Diesel engines which drive shafts D and D' respectively, which in turn drive main generators B and B' and auxiliary generators C and C' directly connected thereto. Line 13 connects one side of the armature of generator B to one side of the armature of generator B'. Lines 11 and 12 lead from each of the other sides of the armatures of the respective main generators to a motor E which drives the propeller shaft F. Lines 1 and 2 lead from the auxiliary generator C, to the automatic transfer device G, and lines 5 and 6 are take offs from lines 1 and 2 respectively, which, through lines $5_1$ and $6_1$ respectively are connected with the field coils of main generators B and B'.

Auxiliary generator C' is connected by lines 3 and 4 to the automatic transfer device G, said lines 3 and 4 having take offs 7 and 8, respectively which permit current from generator C' to be supplied to incidental electrical mechanisms, such for example, as electrically driven water pumps or the like.

The automatic transfer device G, shown in detail in Fig. 2, comprises four electromagnetic relays $h$, $i$, $j$ and $k$, which operate to connect lines 1 and 2, and lines 3 and 4, respectively to lines 9 and 10, and a fifth electro-magnetic relay $m$, connected in the pilot circuit for operating the pilot switch P. Lines 1 and 2 leading into the automatic transfer device G, are connected to lines 9 and 10 respectively through the respective armatures $h_1$ and $i_1$ when current at a voltage above a predetermined minimum is passed through the relays $h$ and $i$. Likewise lines 3 and 4 are connected to lines 9 and 10 respectively through the respective armatures $j_1$ and $k_1$ of the relays $j$ and $k$ respectively when current at a sufficiently high voltage is passed through these two relays.

The pilot switch P comprises a piece of insulating material having electrical contacts $p_1$ and $p_2$ at its respective ends. This switch is held in its normal position by a coil spring $s$, and is adapted to swing about the pivot $x$. The relay $m$, when current at a sufficiently high voltage is being passed therethrough, tends to turn the pilot switch in a counter clockwise direction, thereby disconnecting the pilot circuit through relays $h$ and $i$, thus permitting the armatures $h_1$ and $i_1$ to drop downwardly due to the force of gravity, and thereby disconnect lines 1 and 2 from lines 9 and 10. When the pilot switch is in such position, the pilot circuit leading through relays $j$ and $k$ is completed, and when current at the desired voltage is passed through these relays the armatures $j_1$ and $k_1$ are brought into position so that they connect lines 3 and 4 to lines 9 and 10 respectively.

Following the pilot circuit through relays $h$ and $i$, a lead 13 is taken off from line 1 and connects with one end of the coil of relay $h$. Lead 14 connects the other end of the coil in this relay to one end of the coil in relay $i$. The other end of the coil in relay $i$ is connected by line 15 to the contact $p_3$ of the pilot switch P. When the pilot switch is held in its normal position by coil spring $s$, the contact $p_3$ is in electrical communication with the contact $p_1$ of said switch, which is connected directly through the slack wire 17 and the line 16 to the line 2. It will be seen that when current at a voltage above a predetermined minimum is passed through the pilot circuit just described relays $h$ and $i$ will operate to connect lines 1 and 2 to lines 9 and 10 respectively.

The pilot circuit connected with relays $j$ and $k$ is as follows: Line 24 leads from the line 3 and is connected by line 23 through the slack wire 27 to the contact $p_2$ of the pilot switch P. When the relay $m$ is operating, the contact $p_2$ is in electrical communication with contact $p_4$ which in turn connects through line 19 to one end of the coil of relay $j$. Line 20 is a lead off from line 19 and connects with one end of the coil of relay $k$. The other end of the coil of relay $j$ connects with line 18 which leads to one end of the coil of relay $m$. The other end of the coil in relay $k$ is connected by line 21 to the line 18, which through line 22 connects directly with the line 4. Thus it will be seen that the coils in each of the relays $j$ and $k$ are connected directly across lines 3 and 4, through the contacts $p_2$ and $p_4$ of the pilot switch P.

Following the circuit through the relay $m$, line 24 leads directly from line 3 through the non-inductive resistance 25 and the line 26 to one end of the coil of relay $m$. The other end of the coil in this relay is connected by line 18 to line 22 which leads back into the line 4. It follows therefore that when current at a sufficient voltage is passing through lines 3 and 4, such current is simultaneously passing through the coil of relay $m$ and the pilot switch P is being held with the contacts $p_1$ and $p_3$ out of electrical communication, and with the contacts $p_2$ and $p_4$ in communication with each other. Under these circumstances current at the desired voltage will also be passing through the coils in relays $j$ and $k$, and therefore lines 3 and 4 will be connected with lines 9 and 10 respectively. On the other hand when no current or current at a voltage below that which is desired is passing through lines 3 and 4, the relay $m$ will be inoperative and the coil spring $s$ will tend to pull the pilot switch P in a clockwise direction, thus bringing the contacts $p_1$ and $p_3$ in communication with each other and breaking the connection between contacts $p_2$ and $p_4$, thereby allowing the passage of current through the coils of relays $h$ and $i$ which in turn will operate the armatures $h_1$ and $i_1$ to form closed connections between lines 1 and 2 and lines 9 and 10 provided, of course, that there is sufficient voltage across lines 1 and 2 to operate relays $h$ and $i$.

It will thus be seen that when for any reason there is a failure of current through lines 3 and 4 to lines 9 and 10 respectively, or when the voltage in lines 3 and 4 drops below a predetermined minimum, lines 3 and 4 will be immediately disconnected from lines 9 and 10, and lines 1 and 2 respectively will be simultaneously connected therewith if there is sufficient voltage across lines 1 and 2. In this way an uninterrupted supply of current at a desired voltage to lines 9 and 10, which connect with the motor of the steering engine and the other electrical navigation devices whose operation is essential, is maintained at all times.

What I claim is:

1. In combination, a plurality of units each comprising a main generator, an auxiliary generator and a common prime mover for said generators, a load circuit for one of said auxiliary generators comprising a field winding of at least one of said main generators, an auxiliary load circuit for a second of said auxiliary generators, and means interposed between said one auxiliary generator, said second auxiliary generator and said auxiliary load circuit for automatically transferring the auxiliary load circuit from one to the other of said auxiliary generators under predetermined circuit conditions.

2. An electric propulsion system for ships which comprises, in combination, a plurality of generating units each comprising a main generator, an auxiliary generator and a common prime mover for said generators, a load circuit communicating with one of said auxiliary generators comprising a field winding of at least one of said main generators, electrical steering mechanism, a circuit including said mechanism and a second of said auxiliary generators, and means interposed in said last mentioned circuit for automatically transferring the load from one to the other of said auxiliary generators upon failure of voltage in the one, thereby to supply a continuous current at a predetermined voltage to said electrical steering mechanism.

3. An electric propulsion system for ships which comprises in combination, a plurality of generating units at least one of which comprises a main generator, an auxiliary generator and a common prime mover for said generators, a second of said units comprising an auxiliary generator, a load circuit communicating with one of said auxiliary generators comprising the field winding of a main generator, an auxiliary load circuit for another of said auxiliary generators, and means interposed between the one auxiliary generator, said other auxiliary generator and the auxiliary load circuit for automatically transferring the auxiliary load circuit from one to the other of said auxiliary generators under predetermined circuit conditions.

In testimony whereof I affix my signature.

LESTER M. GOLDSMITH.